Figure 1:
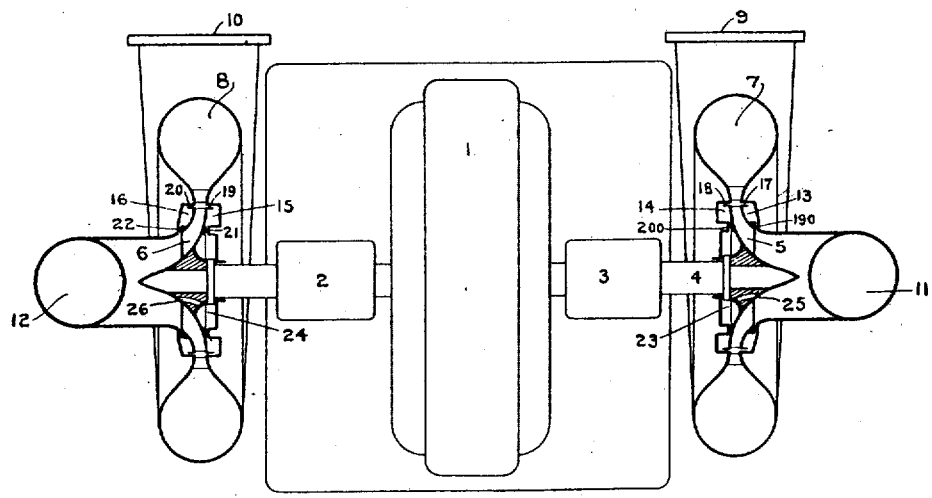

UNITED STATES PATENT OFFICE.

ARNOLD PFAU, OF MILWAUKEE, WISCONSIN, ASSIGNOR TO ALLIS-CHALMERS COMPANY, OF MILWAUKEE, WISCONSIN, A CORPORATION OF NEW JERSEY.

HYDRAULIC TURBINE.

1,023,585.  Specification of Letters Patent.  Patented Apr. 16, 1912.

Application filed February 8, 1912. Serial No. 676,541.

*To all whom it may concern:*

Be it known that I, ARNOLD PFAU, a citizen of the Republic of Switzerland, residing at Milwaukee, in the county of Milwaukee and State of Wisconsin, have invented a certain new and useful Improvement in Hydraulic Turbines, of which the following is a specification.

This invention relates to hydraulic turbines of the Francis type, that is, hydraulic turbines where there is a re-active end thrust of the water upon the runner.

The object of the invention is to provide means for balancing the natural end thrust of the turbine in the most efficient way with the least number of bearings.

More specifically, the object of the invention is to provide a twin arrangement of this type of turbine directly connected to an electric generator, each unit of the twin arrangement being a single discharge Francis turbine.

Heretofore Francis turbines have been built as independent units having at least two bearings so that each could be operated by itself without being connected to a generator. Exceptionally, turbines were designed for direct connection to electric generators, in which the turbine bearing next the generator was omitted and the generator bearing nearest the turbine made to serve for the omitted bearing. Direct connected single discharge Francis turbines have been made in which the angular discharge pipe was located remote from the generator, or with such discharge pipe near said generator. Direct connected single discharge twin turbines have been made in which the turbine has been arranged at one side of the generator and with the discharge of the turbine common between the two units, or separate with a common runner casing between them. In all of the four cases just referred to, however, it was necessary to provide a thrust bearing and it was usual to make one of the two turbine bearings a thrust bearing for the purpose of taking up the end thrust where the one runner was used and for the purpose of taking up the difference in end thrust where the two runners were used in the twin arrangement. In the four arrangements of turbine referred to, the turbine bearing nearest the generator could be omitted, as already referred to hereinabove as in the case of the single runner machine, but it was also necessary to keep the remaining bearing to serve as a thrust bearing.

In the development of the invention application for patent for which has been filed Feb. 20, 1911, Serial No. 609,573, the end thrust of a single discharge Francis turbine is taken up hydraulically by providing pressure chambers on both sides of the runner. In addition to this hydraulic means for taking up the end thrust, a mechanical thrust bearing is provided for safety. It is found that it is unnecessary to provide the mechanical end thrust bearing even for starting and that the hydraulic means provided is entirely sufficient at all times to take up the end thrust. The result of this discovery is the production of a single discharge Francis turbine direct connected to a generator so that the runner is entirely overhung on the generator shaft and there are no turbine bearings whatever. The practical development of this machine however, is in the twin arrangement in which a similar single discharge Francis turbine is located on each side of the generator, each of the runners being overhung on the generator bearings, and the invention is so presented herein.

Figure 2:
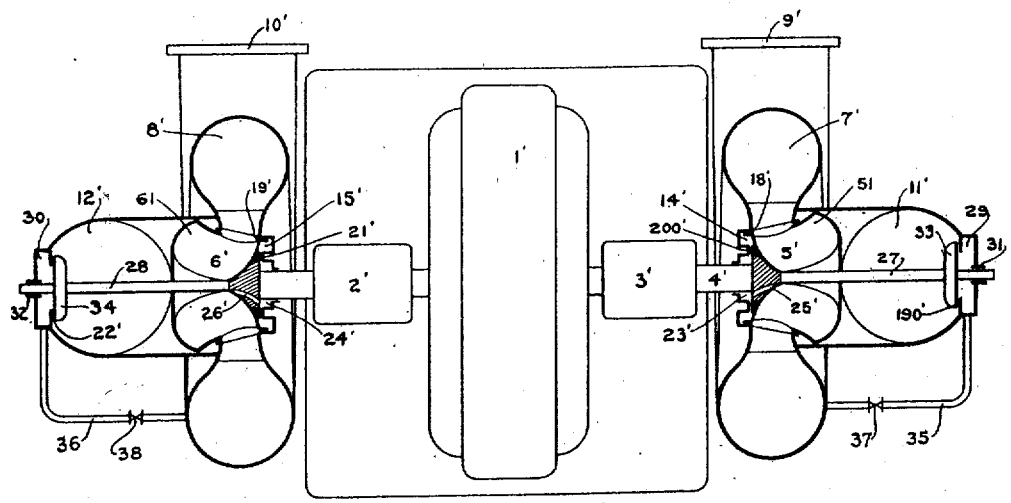

In the drawing, Figure 1 is a diagrammatic sectional plan view of a direct connected twin single discharge Francis turbine; and Fig. 2 is a similar view of a similar machine having higher speed characteristics and therefore necessitating separate balancing pistons.

In the drawing the electric generator which has two bearings 2, 3, has its shaft 4 extended at each end so as to mount thereon, fixed against end thrust, the runners 5, 6, of the turbines 7, 8, having the usual inlets 9, 10, and the angular discharge pipes 11, 12. Pressure balancing chambers 13, 14, 15, 16, are formed in the turbine casing on both sides of the runners 5, 6, the inlet passages 17, 18, 19, 20, thereto being between cylindrical surfaces so as to be of practically constant section; while the discharge passages 190, 200, 21, 22 therefrom are formed between plane surfaces which, at each respective discharge passage, by approaching and receding from each other, vary the cross-section of the passage accordingly. The pressure balancing chambers 14, 14, on the generator side of the turbine, discharge to other chambers 23, 24, which are in communication through ports 25 and 26 in the runners with the discharge pipes 11, 12.

In the operation of the machine shown in Fig. 1, the balancing is automatically accomplished by the pressure of the water in pressure balancing chambers 13, 14, 15, 16, the pressure in chambers 13, 15, at the right of the runners 5, 6, increasing as the rotating parts move to the right by reason of the reduction of the size of the passages 190, 21, also at the right of the runners 5, 6. At the same time the enlargement of the discharge passages 200, 22, at the left of the respective runners 5, 6, brings about a reduction of pressure of the water in chambers 14, 16 at the left of the respective runners 5, 6, and so the rotating parts are moved back toward the left to overcome the abnormal end thrust which caused motion of the rotating parts to the right.

In the machine shown in Fig. 2, the generator 1' is provided with bearings 2', 3' for the shaft 4', the ends of which are extended in the same way to provide for the mounting of the overhung runners 5', 6' of the turbines 7', 8' having high speed characteristics, that is, having the runners shaped with flaring passage portions 51, 61. The turbine casings, as before, have inlets 9', 10' and angular discharge pipes 11', 12'. On account of the flaring discharge portions 51, 61, it is preferable to omit the pressure balancing chambers corresponding to those, 13, 16, remote from the generator in Fig. 1, but similar pressure balanced chambers 14', 15', are as before provided on the generator side of the respective runners 5', 6'. To serve in lieu of the omitted pressure balancing chambers, shafts 27, 28, smaller than the main shaft 4', are connected to the ends of the shaft 4' and extend through the angular discharge pipes 11', 12', pressure balancing chambers 29, 30 being formed in these pipes adjacent the stuffing boxes 31, 32, around the ends of the shafts 27, 28. Balanced pistons 33, 34, are fixed to the shafts 27, 28, to close the openings from the chambers 29, 30, into the discharge pipes 11', 12', forming discharge passages 190', 22' formed between plane surfaces. Pipes 35, 36, connect chambers 29, 30, to the respective turbine casings, and valves 37, 38, control the flow through said pipes. The pressure balancing chambers 14', 15' on the generator side of the turbine discharge through passages 200', 21' to other chambers 23', 24', which are in communication through ports 25', 26', in the runners 5', 6', with the discharge pipes 11', 12'.

The operation of the machine shown in Fig. 2 is essentially the same as that of Fig. 1, the pressure in chambers 29, 15', serving to move the rotating parts to the left, while the pressure in chambers 14', 30, serves to move the rotating parts to the right.

It should be observed that if one of the turbines in the case of either of the machines illustrated in the drawing, becomes disabled so that it must be shut down, the other may still be operated and the pressure balancing means of the operating turbine will be sufficient to balance the rotating parts. The machine can be operated even to the extent of dismantling one entire turbine. This, of course, would then be the same as a machine having only one single discharge Francis turbine hydraulically balanced and with its runner overhung on the generator shaft. It should be observed that there are but two main bearings and that when the balancing pistons of the machine of Fig. 2 are used, their shafts serve only to carry the end thrust and are not designed to support the rotating parts. Exceedingly important commercially advantageous features are therefore present in this invention, especially considering the possibility of having one of the turbines dismantled and yet run the remaining turbine. The overhung runners dispense with special turbine bearings and the twin machine makes a symmetric and commercially superior machine.

The term "electric generator" has been used throughout the specification, but this refers to one specific application of the invention, the broader term energy absorber, meaning any device consuming energy, is included in the invention as defined by the claims.

It should be understood that it is not desired to be limited to the exact details of construction shown and described, for obvious modifications will occur to a person skilled in the art.

It is claimed and desired to secure by Letters Patent,—

1. The combination of an energy absorber having two main bearings and having its shaft extended beyond one of said bearings, an overhung Francis turbine runner fixed against end thrust on the extension of the shaft, a turbine casing having its discharge angle remote from the nearer of said bearings, and means for end balancing the rotating parts.

2. The combination of an energy absorber having two main bearings and having its shaft extended, an overhung Francis turbine runner fixed against end thrust on each of the extensions of the shaft, a turbine casing for each runner having its discharge angle remote from the nearer of said bearings, and means for end balancing the rotating parts.

3. The combination of an energy absorber having two main bearings and having its shaft extended, an overhung Francis turbine runner fixed against end thrust on each of the extensions of the shaft, a turbine casing for each runner having its discharge angle remote from the nearer of said bearings, and a plurality of means for end balancing the rotating parts, each of said end balancing means being adapted to balance one of said runners.

4. The combination of an energy absorber having two main bearings and having its shaft extended, an overhung Francis turbine runner fixed against end thrust on each of the extensions of the shaft, a turbine casing for each runner having its discharge angle remote from the nearer of said bearings, and means on either side of said absorber for end balancing the rotating parts whereby either runner or both may be operated.

In testimony whereof, the signature of the inventor is affixed hereto in the presence of two witnesses.

ARNOLD PFAU.

Witnesses:
CHAS. L. BYRON,
G. F. DE WEIN.